Jan. 23, 1951 A. WARING 2,539,045
CHUCK
Filed Nov. 16, 1949
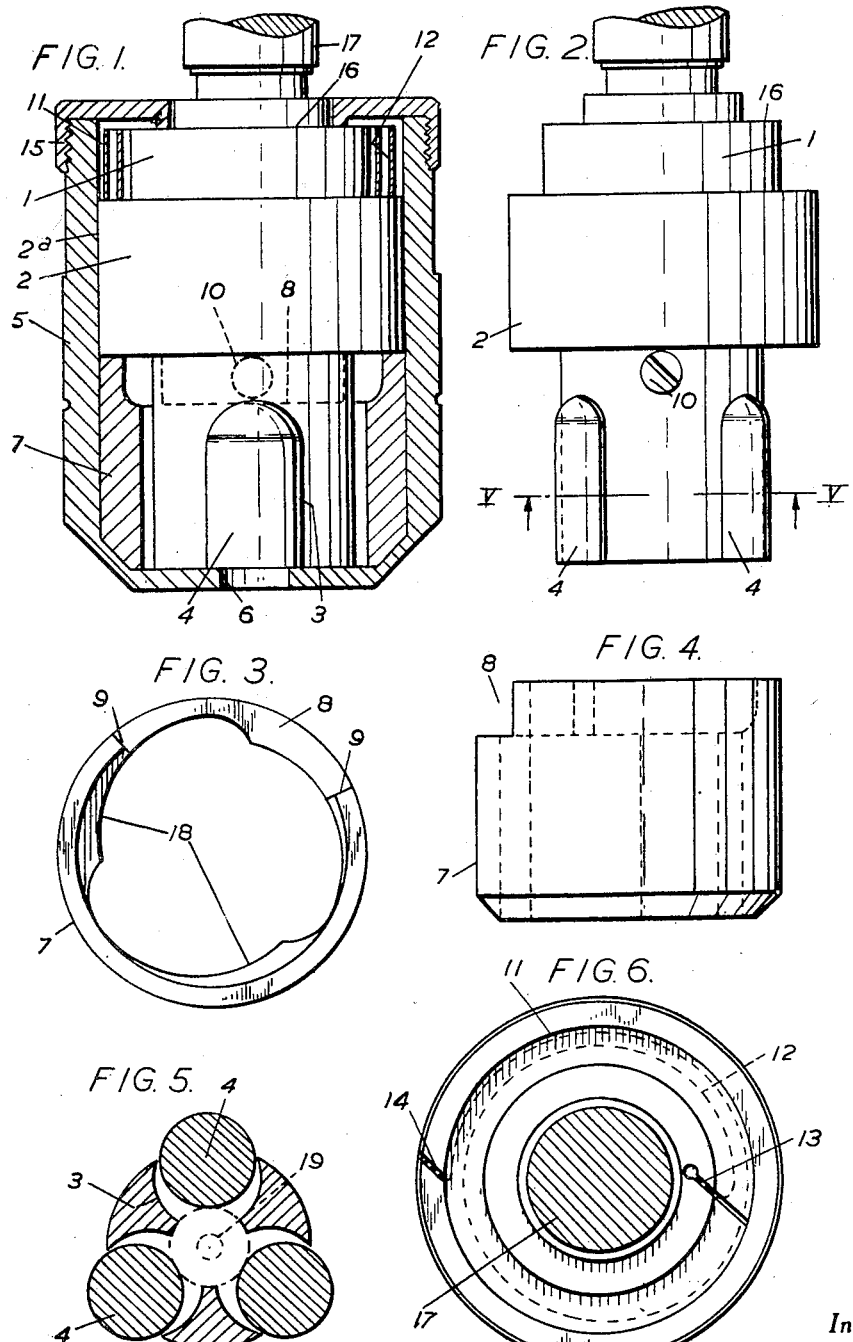
Inventor
Arthur Waring
By C. A. Snow & Co.
Attorneys.

Patented Jan. 23, 1951

2,539,045

UNITED STATES PATENT OFFICE 2,539,045

CHUCK

Arthur Waring, Birmingham, England

Application November 16, 1949, Serial No. 127,551
In Great Britain April 5, 1949

1 Claim. (Cl. 279—72)

This invention relates to chucks of the type in which the shank of the drill or other tool is fixed to the chuck by means of rollers, mounted in a cage, which co-act with a cam on a sleeve rotatably mounted on the cage to move the rollers radially by the relative movement of the cam and rollers, to thereby grip the shank of the tool, the sleeve being normally spring pressed, conveniently by a spiral spring, to urge the gripping rollers towards the gripping position, and this invention has for its object an improved construction of chuck which can be opened whilst it is rotating on the machine spindle without liability of the rollers being returned to the closed position and without liability of the rollers wedging in the cam ring when in the closed position. A still further object is to obviate any projection member on the sleeve which is gripped by the hand to operate the chuck.

Referring to the drawings:

Figure 1 is a part sectional elevation of a chuck constructed according to this invention.

Figure 2 is a side elevation of the inner member of the chuck.

Figure 3 is a plan view of the cam ring.

Figure 4 is a side elevation of the cam ring.

Figure 5 is a section on line V—V of Figure 2, and

Figure 6 is a plan view of the parts shown by Figure 1 with the fixing cap removed.

According to a convenient embodiment of this invention, the inner member of the chuck comprises a cylindrical body portion 2 having a depending portion of reduced diameter in which radial grooves 3 are formed to form a cage for the gripping rollers 4 and for constraining the rollers to have a radial movement. The upper portion 1 of the cylindrical body is of reduced diameter. The sleeve or outer casing 5 is cylindrical and is open at the top and externally screw threaded, the bottom being closed and having a central hole 6 for receiving the shank of the drilling tool or the like. The cam ring 7 is a press fit in the cylindrical body 5 and the rim of the cam ring has a notch or recess 8 to form shoulders 9 at each end which co-act with a stop stud 10 screwed into the wall of the roller cage to limit the relative rotary movement of the said inner member and the sleeve or casing 5. By thus forming the notch 8 in the cam ring 7 and inserting the pin 10 into the inner member 1, no projections or edges are on the exterior of the sleeve 5, so that the hand will not be damaged as the sleeve slips in the hand whilst applying a braking pressure on the sleeve. Further by forming the recess 8 in the top edge of the cam ring 7, the inner member 1 can be assembled in the sleeve. The said reduced cylindrical portion 1 at the top of the body forms an annular recess 11 at the top or inner end of the sleeve or casing 5 for receiving a spiral spring 12 which is coiled from a flat steel strip, one end of the spring being slidden into a vertical groove 13 in the inner body and the other end being engaged in a vertical groove 14 in the top of the casing or sleeve 5. The spring can thus be easily assembled as it is arranged in an open recess at the top of the chuck. The body is retained in the casing against axial movement by a screwed fixing cap 15 which engages the top of the cylindrical body and screws onto the said screwed end of the sleeve or casing and lies over the shoulder 16 to hold the inner clutch member against axial movement. The top of the body has a tapered hole therein for engaging the shank 17 of the drilling machine spindle. The drill 18 or the like is gripped by the rollers 4 which are normally forced inwardly in the gripping position by means of the spiral spring 12 which turns the inner member in a direction to cause the roller 4 to ride up the cam faces 18. When the chuck is rotating and the casing 5 is gripped it produces relative rotary movement of the casing in relation to the body 2, and thus releases the grip on the drill or the like. When the sleeve 5 is gripped whilst a drill spindle, on which the chuck is fixed, is rotating, the inner member 2 rotates relative to the sleeve to the limit allowed by the pin 10 moving against the end of the recess 8, and thus prevents the rollers moving against the shoulder between the outer end of one cam surface 18 and the inner end of the adjacent cam surface 18. If the rollers are permitted to move against such shoulders, as the inner member 2 is continuously rotating, the rollers again move in the closing direction by moving against said shoulders. Again if the chuck is designed to hold a very small diameter shank of a drill, and a shank of a drill is not fitted in the chuck, the rollers would move, by the pressure of the spring 12, against one another and would be wedged together in the cam ring 7, but as the closing movement of the roller ring is limited by the pin 10, such a wedging action is prevented.

The chuck thus described is simple in construction and can be readily assembled. The spring 12 can also be readily assembled and should replacement be required it can be readily effected. The body and the casing has a large rotary bearing surface 2a, so that wear is reduced. By recessing or notching the edge of the cam ring, the need for grooving the body is rendered unnecessary, and loose fixing pins or studs passing through the sleeve or casing is avoided.

Having thus described the invention, what is claimed as new and desired to be secured by Letters Patent, is:

A chuck comprising an inner member incorporating a roller cage, radially movable gripping rollers mounted in the cage, a sleeve having a cylindrical bore rotatably mounted on the said inner member, a separate cam ring inserted into and immovably fixed in the said cylindrical bore of said sleeve for forcing the gripping rollers inwardly by a relative rotary movement of the sleeve and inner member, a circumferentially directed recess in the edge of the cam ring and a pin on the body of the said inner member which engages the recess to limit the relative rotary movement of the cage and sleeve, an enlarged cylindrical body portion on said inner member above the said roller cage for rotatably engaging the said cylindrical bore of the sleeve above the said cam ring, and a spring to normally rotate the sleeve and cam ring in relation to said inner member to urge the gripping rollers inwardly towards the gripping position.

ARTHUR WARING.

REFERENCES CITED

The following references are of record in the file of this patent:

UNITED STATES PATENTS

| Number | Name | Date |
|---|---|---|
| 1,068,263 | Monaghan | July 22, 1913 |
| 1,351,347 | Russell | Aug. 31, 1920 |
| 1,379,986 | Hultman | May 31, 1921 |
| 1,432,225 | Wolnick et al. | Oct. 17, 1922 |
| 1,597,731 | Seiffert | Aug. 31, 1926 |
| 2,063,344 | Schneider | Dec. 8, 1936 |